(12) United States Patent
Granat

(10) Patent No.: US 9,234,504 B1
(45) Date of Patent: Jan. 12, 2016

(54) VARIABLE ALTITUDE WIND-POWERED GENERATOR SYSTEM

(75) Inventor: Stanley M. Granat, Baldwinsville, NY (US)

(73) Assignee: Lockheed Martin Corporation, Bethesda, MD (US)

(*) Notice: Subject to any disclaimer, the term of this patent is extended or adjusted under 35 U.S.C. 154(b) by 977 days.

(21) Appl. No.: 13/188,153

(22) Filed: Jul. 21, 2011

(51) Int. Cl.
    *F03B 11/00* (2006.01)
    *F03D 11/00* (2006.01)
    *F03D 11/02* (2006.01)

(52) U.S. Cl.
    CPC .............. *F03D 11/00* (2013.01); *F03D 11/024* (2013.01)

(58) Field of Classification Search
    CPC ..... F03D 11/00; F03D 11/04; F03D 11/0058; F03D 11/0066; F03D 11/024; F03D 9/00
    USPC ...................... 416/79–88, 100, 103, 104, 106; 244/155 A, 153 R; 290/44, 55
    See application file for complete search history.

(56) References Cited

U.S. PATENT DOCUMENTS 3,924,827 A * 12/1975 Lois ........................... 244/153 R
4,084,102 A * 4/1978 Fry et al. ........................ 290/55

OTHER PUBLICATIONS

"Powering Remote Villages with Airborne Wind Technology", pp. 19-21, Solar Wind and Power, Jun. 2011.
Allan, Sterling D. "Magenn Power's Floating Wind Generators Nearing Deployment", 3 pages, http://pesn.com/2005/12/23/9600211_Magenn_Floating_Wind_Generators/, Dec. 23, 2005.

* cited by examiner

*Primary Examiner* — Craig Kim
*Assistant Examiner* — Maxime Adjagbe
(74) *Attorney, Agent, or Firm* — Howard IP Law Group, PC

(57) ABSTRACT

A wind-powered machine system includes a base station including a machine for performing work and a crankshaft operatively coupled to the machine. The rotation of the crankshaft drives the machine to perform work. The system further includes a first and a second airfoil operatively coupled to the crankshaft. In a first stage, a wind-driven movement of the first airfoil in a first direction away from the base station causes the crankshaft to rotate. The rotation of the crankshaft causes a movement of the second airfoil in a second direction generally opposite to the first direction and toward the base station. In a second stage, a wind-driven movement of the second airfoil in the first direction away from the base station causes the crankshaft to rotate. The rotation of the crankshaft causes a movement of the first airfoil in the second direction toward the base station.

16 Claims, 7 Drawing Sheets

VARIABLE ALTITUDE WIND-POWERED GENERATOR SYSTEM

FIELD OF INVENTION

The present invention relates generally to power generator systems, and more particularly to wind-powered generator systems.

BACKGROUND

Wind-powered generator systems generally include windmill-based systems comprising long blades rotating in a vertical plane mounted on a hub having a horizontal axis. The hub is mounted on a tower sufficiently high to provide clearance between the rotating blades and the ground. The hub is connected to a mechanical drivetrain, which feeds a co-located electromagnetic rotating electrical generator.

Present windmill powered generators have numerous drawbacks including but not limited to high construction costs for the towers, restricted operation in turbulent winds, fixed location, large footprints and operation generally limited to winds in favorable directions. Further, such windmills are limited to a height of about one hundred (100) to about three hundred (300) feet above the ground. Alternative designs are desired.

SUMMARY OF THE INVENTION

According to an embodiment of the invention, a wind-powered machine system includes a base station including a machine for performing work and a crankshaft operatively coupled to the machine. The rotation of the crankshaft drives the machine to perform work. The system further includes a first and a second airfoil operatively coupled to the crankshaft. In a first stage, a wind-driven movement of the first airfoil in a first direction away from the base station causes the crankshaft to rotate. The rotation of the crankshaft causes a movement of the second airfoil in a second direction generally opposite to the first direction and toward the base station. In a second stage, a wind-driven movement of the second airfoil in the first direction away from the base station causes the crankshaft to rotate. The rotation of the crankshaft causes a movement of the first airfoil in the second direction toward the base station.

According to another embodiment of the invention, a wind-powered machine system includes a base station including a machine for performing work, a fluid-powered system for driving the machine and a connecting member associated with the fluid-powered system. The system further includes first and second airfoils operatively coupled to the connecting member. In a first stage, a first wind-driven movement of the first airfoil in a first direction away from the base station causes a first compression of a fluid in the fluid-powered system. The first wind-driven movement of the first airfoil causes, via the connecting member, a second movement of the second airfoil in a second direction generally opposite to the first direction and toward the base station. In a second stage, a third wind-driven movement of the second airfoil in the first direction away from the base station causes a second compression of the fluid in the fluid-powered system. The third movement of the second airfoil causes, via the connecting member, a fourth movement of the first airfoil in the second direction toward the base station. The first and second compressions of the fluid drive the machine to perform work.

According to an embodiment of the invention, a method for driving a machine utilizing wind power includes the steps of causing a first airfoil to be driven by wind. The first airfoil is operatively coupled to a connecting member, which connecting member is operatively coupled to a machine on a base station. The first airfoil is driven away from the base station by the wind. The method further includes the step of causing a second airfoil operatively coupled to the connecting member to be pulled toward the base station as a result of the wind-driven movement of the first airfoil while moving the connecting member. The method also includes a step of causing the second airfoil to be driven by wind away from the base station while causing the first airfoil to be pulled toward the base station as a result of the wind-driven movement of the second airfoil while moving the connecting member. The movements of the connecting member drive the machine to perform work.

According to an embodiment of the invention, a method for driving a machine utilizing air currents comprising the steps of: exposing first and second airfoils to air currents; and controllably altering the lift generated by at least one of the first and second airfoils, wherein the first airfoil is operatively coupled to a connecting member operatively coupled to a machine on a base station, wherein the first airfoil is driven by the air currents in a first direction to cause movement of the connecting member; and wherein the movement of the connecting member causes the second airfoil operatively coupled to the connecting member to be biased in a second direction. In one configuration, the first direction is a direction away from the connecting member, and the second direction is a direction toward the connecting member. The step of controllably altering the lift of at least one of the first and second airfoils may include reducing the lift generated by the second airfoil. In one configuration, the step of controllably altering the lift generated by at least one of the first and second airfoils comprises controllably altering the in-flight position of the first and/or second airfoil. In one configuration, the system controller may work autonomously to adjust (e.g. increase) the lift of the second airfoil, and/or adjust (e.g. reduce) the lift generated by the first airfoil, wherein the second airfoil is driven by air currents generally in the first direction to cause movement of the connecting member, and wherein the movement of the connecting member causes the first airfoil operatively coupled to the connecting member to be biased generally in the second direction.

BRIEF DESCRIPTION OF THE DRAWINGS

Understanding of the present invention will be facilitated by consideration of the following detailed description of the exemplary embodiments of the present invention taken in conjunction with the accompanying drawings, in which like numerals refer to like parts and in which.

DETAILED DESCRIPTION

It is to be understood that the figures and descriptions of the present invention have been simplified to illustrate elements that are relevant for a clear understanding of the present invention, while eliminating, for purposes of clarity, many other elements found in such power generator systems and wind-powered generator systems. However, because such elements are well known in the art, and because they do not facilitate a better understanding of the present invention, a discussion of such elements is not provided herein. The disclosure herein is directed to all such variations and modifications known to those skilled in the art.

While embodiments of the present invention will be described generally herein as "wind-powered", it should be understood that the term "wind" is intended to encompass any gas (e.g. air) current, man-made or naturally occurring. Moreover, it should also be recognized that, in addition to gas, each of the embodiments of the present invention may be powered by, for example, a fluid current.

Figure 1A:
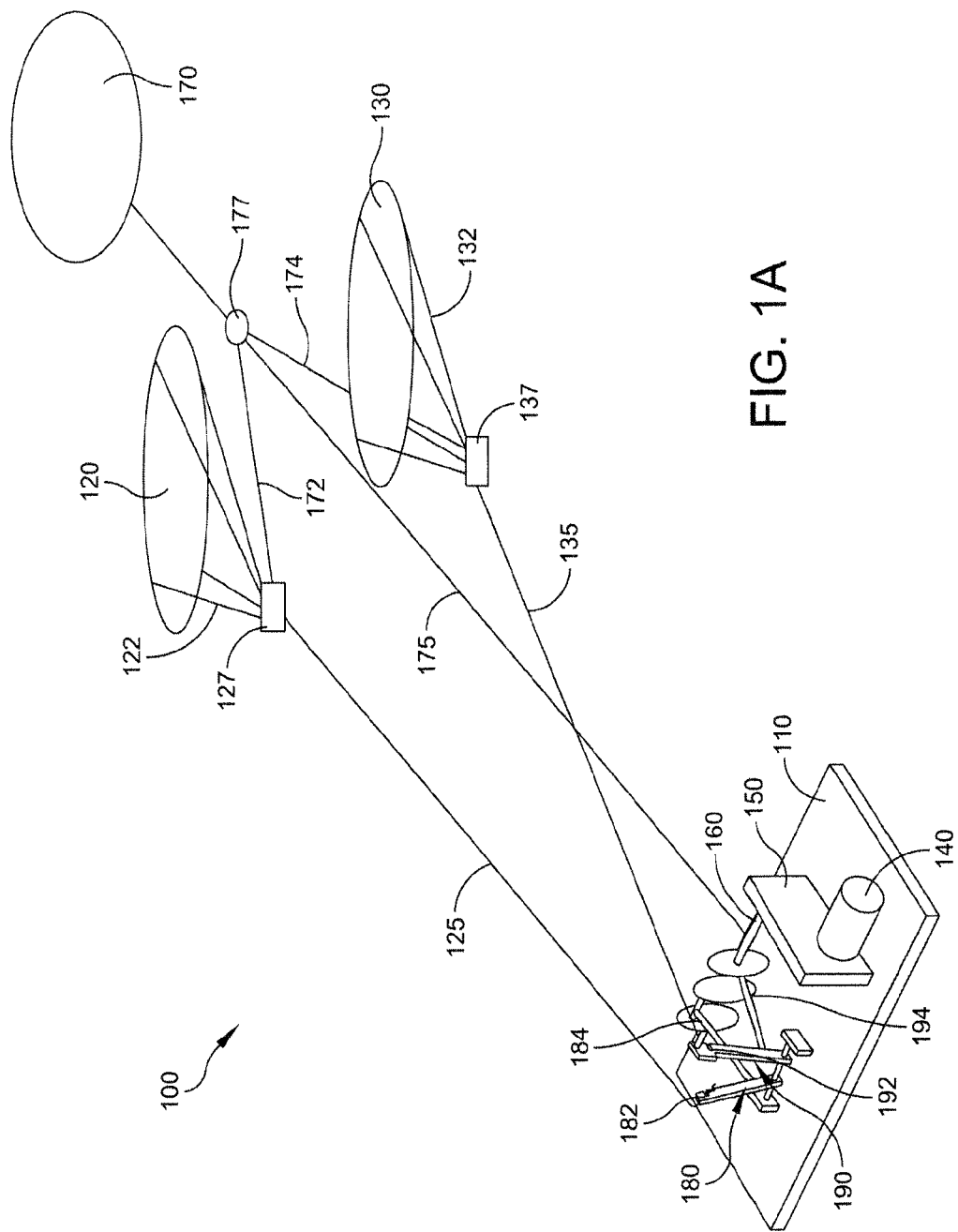
FIG. 1A is a schematic illustration of a variable altitude wind-powered generator system, according to an embodiment of the invention.

Referring to FIG. 1A, a wind-powered system 100 according to an embodiment of the invention is schematically illustrated. In an exemplary embodiment, system 100 includes a base station 110 and at least two airfoils 120, 130 operatively coupled to base station 110. The airfoils are configured for lift and elevated in air currents to enable the capture of wind energy. Other embodiments of the invention may include more than two airfoils, depending on the requirements of a given application. In an embodiment of the invention, base station 110 may be permanently fixed on the ground or other substrate. In other embodiments, base station 110 may be mobile and/or portable, for example, be mounted on a truck bed, ship or barge.

Base station 110 includes a machine 140 for performing work. In an exemplary configuration, machine 140 may take the form of an electrical generator for generating electricity. Electrical generators, including induction generators, permanent-magnetic alternators, and brushless DC generators working on, for example, electromagnetic principles are known in the art and, therefore, are not described in further detail for the sake of brevity. In other embodiments, machine 140 may be any machine which can convert mechanical motion imparted thereto into mechanical work such as, by way of non-limiting example only, a pump, motor or actuator. In yet other embodiments, machine 140 may convert the energy of a compressed fluid into work. Base station 110 further includes a connecting member 160 and an optional gearbox 150 associated with machine 140 and connecting member 160. As described in detail below, wind-driven airfoils 120, 130 exert torque on connecting member 160. In one configuration, optional gearbox 150 converts high torque, but relatively slow, rotational motion of connecting member 150 to relatively high speed rotational motion for machine 140.

In the illustrated embodiment, connecting member 160 takes the form of a crankshaft. As is known in the art, a crankshaft translates generally reciprocating linear piston-like motion into rotational motion. In an exemplary embodiment, airfoils 120, 130 act as generally reciprocating pistons and such motion of airfoils 120, 130 is translated into rotational motion by connecting member 160 and used to drive machine 140. In the illustrated configuration, system 100 further includes rocker arms 180, 190. Rocker arm 180 has a first arm 182 and a second arm 184. Likewise, rocker arm 190 has a first arm 192 and a second arm 194. First arm 182 is coupled to airfoil 120 via a tension cable 125. First arm 192 is coupled (e.g. tethered) to airfoil 130 via a tension cable 135. Second arms 184, 194 are operatively coupled to connecting member 160 (e.g. at 180 degrees with respect to one another). Thus, airfoils 120, 130 are operatively coupled to connecting member 160. In an exemplary embodiment, tensions cables 125, 135 may be coupled to respective arms 182, 192 via rotatable drums to facilitate the adjustments in the length of tension cables 125, 135. More specifically, tension cables 125, 135 may be retracted and extended from spools or drums mounted along, for example, the pivot axis of respective arms 182, 192. In an alternate embodiment, the drums may be arranged remotely from arms 182, 192, for example, on base 110. A pulley arrangement, or other suitable means to guide tension cables 125, 135 to the ends of arms 182, 192 may be provided. Tension cables 125, 135 may comprise any suitable material, including natural or synthetic materials having a sufficiently high tensile strength to weight ratio.

Still referring to FIG. 1A, airfoils 120, 130 may take the form of commercially available parawing structures with steerage lines to permit, for example, the adjustment of the lift and steerage direction of the parawing structures. In an exemplary configuration, airfoils 120, 130 may resemble airplane wings but are constructed from rip-stop nylon or other such similar light-weight, high tensile strength materials. As is known in the art, rip-stop nylon is a lightweight nylon fabric with inter-woven reinforcement threads in a cross-hatch pattern. Airfoils 120, 130 further include internal fabric gussets (not shown) to adjust airfoil lift, for example, by holding airfoils 120, 130 in an appropriate wing shape for given wind conditions. Airfoils 120, 130 include steerage lines 122, 132, respectively, to permit the adjustment of the lift and steerage direction of airfoils 120, 130. In an exemplary configuration, airfoils 120, 130 provide adjustable, effective wind capture cross sections, for example, by bowing airfoils 120, 130 or by rolling up the ends of airfoils 120, 130 to shorten the span thereof. Since such parawing structures with steerage lines are known in the art, they are not described in further detail for the sake of brevity.

Airfoils 120, 130 further include airfoil controllers 127, 137, respectively, in an exemplary embodiment. In one configuration, airfoil controllers 127, 137 may take the form of autopilots configured to control steerage lines 122, 132, respectively, to control the flight pattern of airfoils 120, 130, respectively. Airfoil controllers 127, 137 may include servo controllers (not shown) for controlling steerage lines 122, 132, respectively, which steering lines 122, 132, in turn, adjust, for example, the span, cross-section and angle of attack with respect to wind direction of airfoils 120, 130. Such servo controllers are known in the art and, therefore, are not described in further detail for the sake of brevity. Tension cables 125, 135 may include power supply lines (not shown) to supply power to airfoil controllers 127, 137 and communication lines (not shown) for communication between base station 110 and airfoil controllers 127, 137, respectively. In an alternate embodiment, airfoil controllers 127, 137 may comprise small wind turbine generators and energy storage devices (e.g. batteries or capacitors) used to supply all or part of the power required for flight control.

System 100 may further include a dirigible 170 operatively coupled to base station 110, as well as to airfoils 120, 130. As is known in the art, a dirigible is a type of aerostat, i.e., a system that remains aloft primarily through the use of buoyant lighter than air gases, which provide the system nearly the same overall density as the air. Dirigible 170 is operatively coupled to base station 110 via a tethering cable 175. Tethering cable 175 has an adjustable length, thereby facilitating an adjustment in the altitude of dirigible 170 relative to base station 110. Dirigible 170 is operatively coupled to airfoils 120, 130 via cables 172, 174, respectively. Dirigible 170 is configured to hover in the air for an extended period. Dirigible 170 serves to suspend airfoils 120, 130 in the air, and prevent airfoils 120, 130 from settling down to the ground, particularly when the wind velocity drops below a threshold necessary to maintain the flight of airfoils 120, 130, thereby halting the operation of system 100. While a preferred embodiment is shown utilizing a dirigible, other means (e.g. balloons, aircrafts, ground based poles, extensions, and the like) of "suspending" airfoils for preventing their unintended grounding is contemplated.

In one configuration, system 100 includes an altitude controller 177 operatively coupled to dirigible 170 as well as to airfoil controllers 127, 137. Altitude controller 177 serves to control the altitude of airfoils 120, 130. In an exemplary embodiment, altitude controller 177 adjusts the airfoil altitude by adjusting its position along the length of tethering cable 175. Tethering cable 175 may include the communication lines and the power supply lines to altitude controller 177 or may be employ wireless or optical communication techniques. Cables 172, 174 may include communication lines (not shown) between airfoil controllers 127, 137 and altitude controller 177. It should be understood that the altitude of the airfoils and dirigible may also be controlled by mechanisms for adjusting length of tethering cables. These mechanisms, such as winches and spools, are known in the art and, therefore, are not described in further detail for the sake of brevity.

Figure 1B:
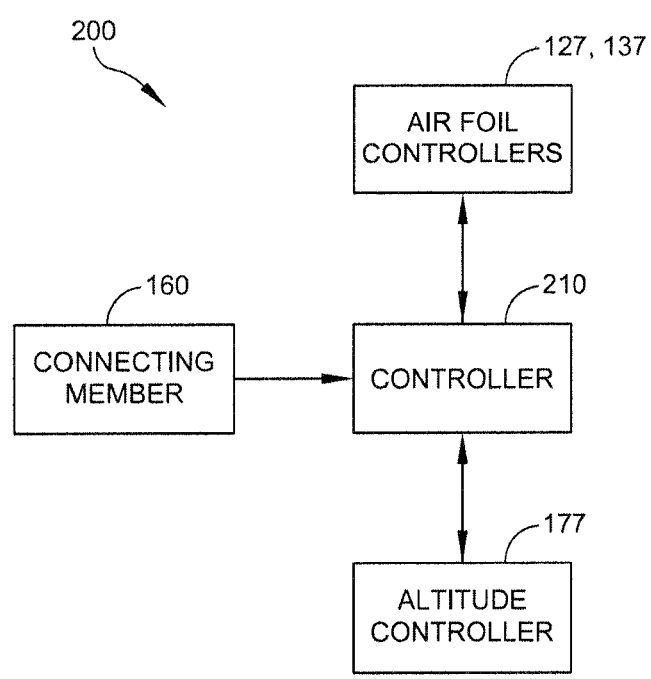
FIG. 1B is a schematic illustration of a controller system for the system of FIG. 1A, according to an embodiment of the invention

Referring now to FIG. 1B, a control system 200 for system 100, is schematically illustrated, according to an embodiment of the invention. Control system 200 includes a controller 210 in electrical communication with airfoil controllers 127, 137 and altitude controller 177. In an exemplary configuration, controller 210 may take the form of a general purpose computer with at least a microprocessor and a memory. In other configurations, controller 210 may be a special purpose computer configured to control wind-powered system 100.

Controller 210 may receive data signals from one or more sensors (not shown) indicative of, for example, the rotational speed and the position of the crank-pins or crank-journals of connecting member 160. The sensors may comprise, for example, optical sensors, or transducers, such as Hall effect sensors, located proximate connecting member 160. Controller 210 may also receive data signals indicative of wind velocity from one or more sensors (not shown) on airfoil controllers 127, 137, and of the cross-section and span of airfoils 120, 130. Controller 210 further receives data signal indicative of the altitude of dirigible 170 from altitude controller 177. Controller 210 may also receive data signals from sensors or sources external to system 100, for example, data signals indicative of wind velocities and directions at different altitudes. Depending on the various data signals, controller 210 may transmit control signals to airfoil controllers 127, 137 and altitude controller 177 to control the operation of system 100, including by way of non-limiting example, altering at least one of the altitude and in-flight orientation of the first and second airfoils. The system controller may be configured to provide autonomous control of the airfoils. As set forth above, these control signal paths may be implemented using various techniques, including by way of non-limiting example, hardwired, wireless and/or optical arrangements.

Referring to FIGS. 1A and 1B, the operation of system 100 is described. In a first stage of operation, airfoil 120 is driven by the wind in a direction away from base station 110. The wind-driven movement of airfoil 120 pulls cable 125 away from base station. Cable 125, in turn, pulls on arm 182 of rocker arm 180. The movement of arm 182 causes arm 184 to rotate connecting member 160, i.e., a crankshaft in this embodiment. The rotation of connecting member 160 causes a movement of arm 194 of rocker arm 190. The movement of arm 194, in turn, causes a movement of arm 192, which, in turn, pulls cable 135 toward base station 110. Cable 135, thus, pulls airfoil 130 toward base station 110, as wind-driven airfoil 120 is moving away from base station 110. The movement of airfoil 130 toward base station 110 may be facilitated by airfoil controller 137, which may reduce the lift of airfoil 130 responsive to the control signals from controller 210. More specifically, airfoil controller 137 may operate to alter the length of steerage lines 132, and thus the angle of attack of airfoil 130. Sufficient change in the angle of attack of airfoil 130 with respect to the direction of the wind may reduce airfoil lift (e.g. inducing a stall), lowering the airfoil's resistance to being pulled toward base station 110 via tension on cable 135. At the end of the first stage, airfoil 120 is at the farthest position from base station 110, whereas airfoil 130 is at the nearest position to base station 110, for given lengths of cables 125, 135, respectively.

As the second stage of the operation begins, airfoil controller 137 causes the lift of airfoil 130 to increase, whereas airfoil controller 127 causes the lift of airfoil 120 to decrease in the above-described manner, responsive to control signals from controller 210. Thus, airfoil 130 is now wind-driven away from base station 110. Wind-driven movement of airfoil 130 causes, via cable 135, a movement of arm 192, which, in turn, moves arm 194. The movement of arm 194 causes connecting member 160 to continue to rotate in the same direction as that during the first stage. The rotation of connecting member 160 causes a movement of arm 184. The movement of arm 184 causes a movement of arm 182, which, in turn, pulls on cable 125. Cable 125, thus, pulls airfoil 120 toward base station 110. Thus, in the second stage, the wind-driven movement of airfoil 130 away from base station 110 causes the connecting member to rotate and the rotation of the connecting member 160 causes the first airfoil to move toward base station 110. At the end of the second stage, airfoil 130 is at the farthest position from base station 110, whereas airfoil 120 is at the nearest position to base station 110, for given lengths of cables 125, 135, respectively. The rotation of connecting member 160 in both stages drives machine 140 to perform work. The wind-driven movements of airfoils 120, 130, aided by the selective altering of the lift generated by respect airfoils 120, 130, continue to rotate connecting member 160 so long as wind is available at sufficient speeds to maintain the flights of airfoils 120, 130. Airfoils 120, 130 flying away from and/or toward base station 110 follow shallow, generally elliptical, parallel flight paths.

Figure 2:
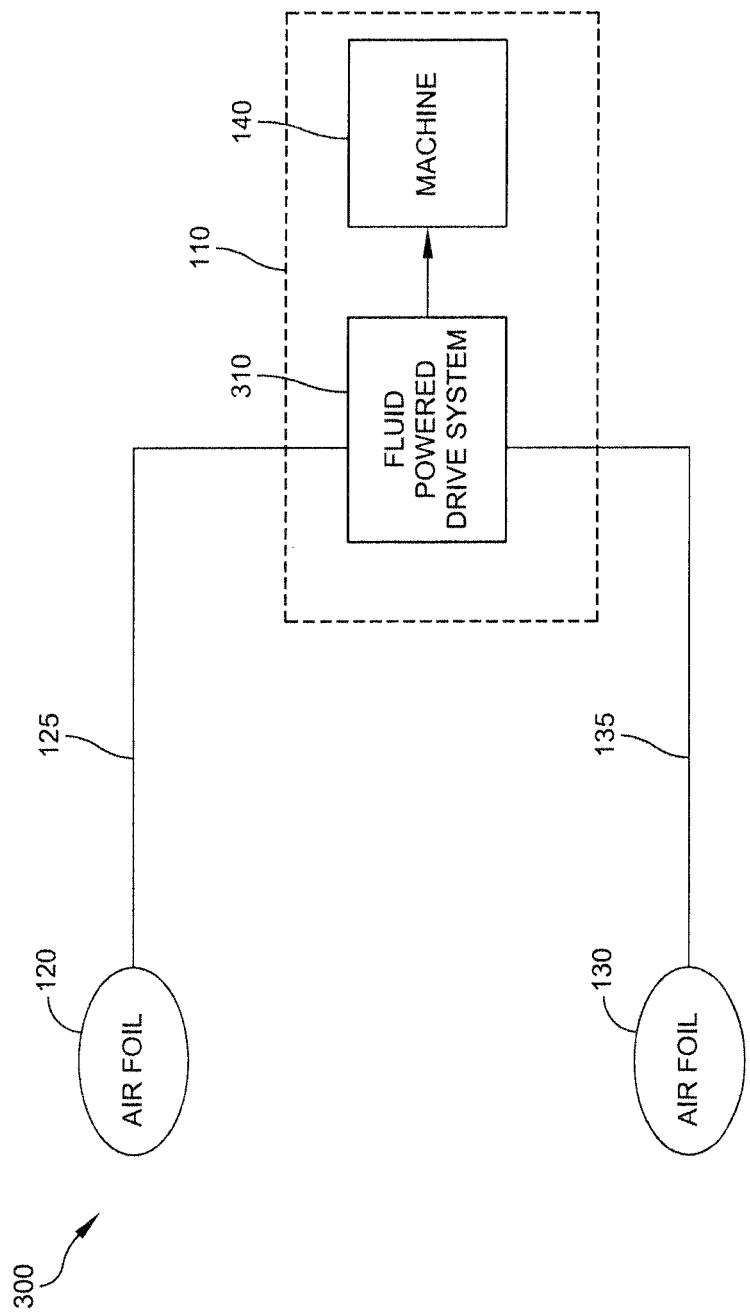
FIG. 2 is a schematic illustration of a variable altitude wind-powered generator system with a fluid-powered drive system, according to an embodiment of the invention.

Referring now to FIG. 2, a wind-powered system 300 is schematically illustrated according to another embodiment of the invention. System 300 includes a base station 110. Base station 110 includes a machine 140 for performing work and a fluid-powered drive system 310 operatively coupled to, and for driving, machine 140. Airfoils 120, 130 are operatively coupled to drive system 310. Fluid-powered drive system 310 includes a connecting member (not shown), for example, a piston, which operatively couples airfoils 120, 130 to drive system 310. In an exemplary embodiment, drive system 310 may take the form of a hydraulic drive system. In another embodiment, drive system 310 may take the form of a pneumatic drive system. Wind drive airfoils 120, 130 drive fluid-powered drive system 310, which, in turn, drive machine 140. In an exemplary embodiment, machine 140 may take the form of an electrical generator for generating electricity. System 300 further includes a control system (not shown), similar to control system 200 to control the operation of airfoils 120, 130, drive system 310 and machine 140. In an exemplary configuration, system 300 also includes a dirigible (not shown), similar to dirigible 170 (of FIG. 1) and an altitude controller (not shown), similar to altitude controller 177 (of FIG. 1).

Figure 3:
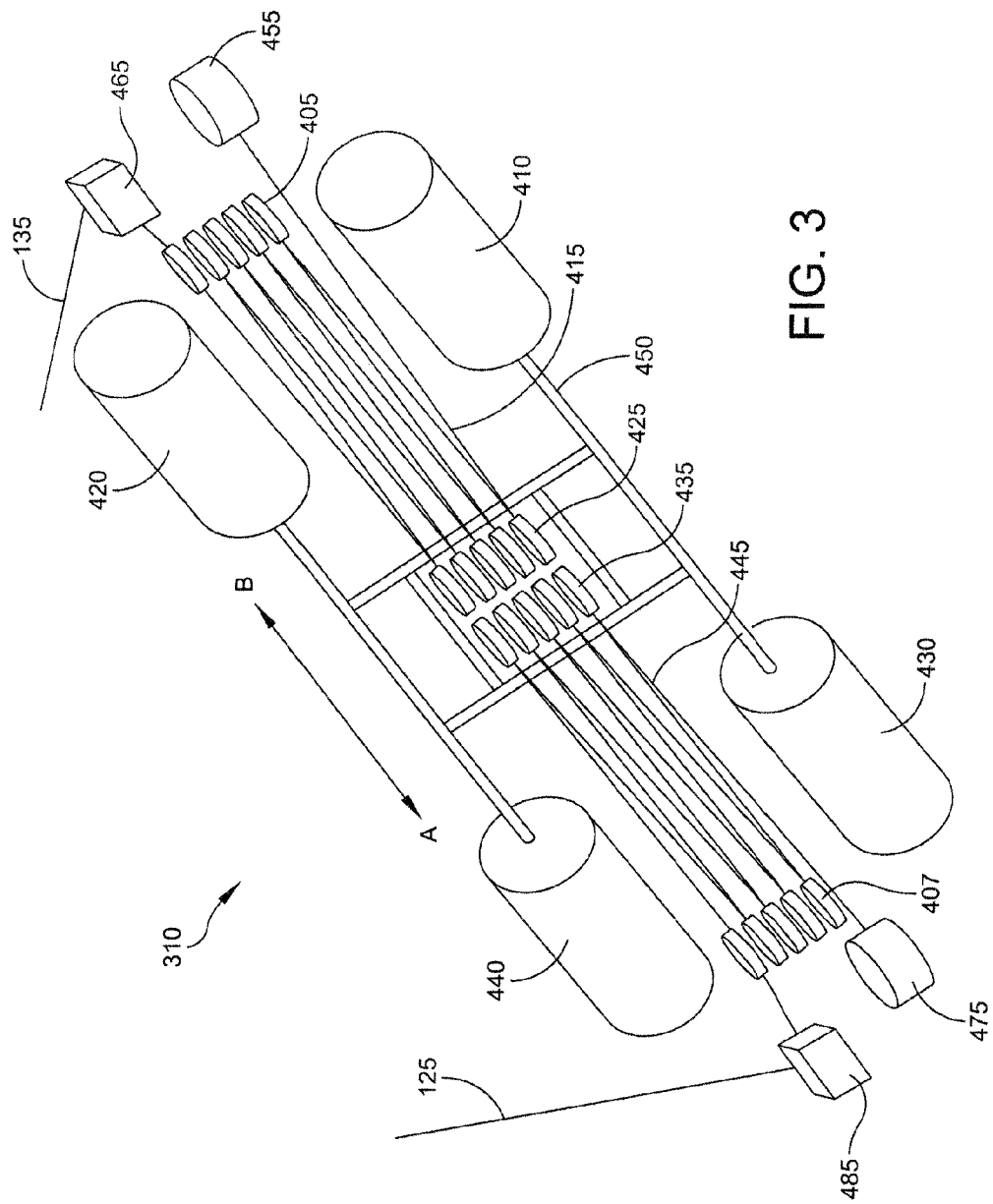
FIG. 3 is a schematic illustration of a fluid-powered drive system of FIG. 2, according to an embodiment of the invention.

Referring to FIG. 3, a fluid-powered drive system 310 for system 300 is schematically illustrated, according to an embodiment of the invention. Drive system 310 includes a first set of fluid-powered cylinders 410, 420 and a second set of fluid-powered cylinders 430, 440. In the illustrated embodiment, each set includes two fluid-powered cylinders. In other embodiment, each set may include more than or less than two fluid-powered cylinders. In an exemplary embodiment, cylinders 410, 420, 430, 440 may take the form of hydraulic cylinders. In another embodiment, cylinders 410, 420, 430, 440 may take the form of pneumatic cylinders. Fluid-powered cylinders 410, 420, 430, 440 may be further coupled to other elements of a fluid-powered drive system such as a fluid-powered pump or motor (not shown) to transform the energy of compressed fluid into work. Alternate embodiments may utilize an intermediate pressure vessel to buffer the machine 140 from fluctuations in power due to wind speed changes.

A piston 450 is associated with each of fluid-powered cylinders 410, 420, 430, 440. Piston 450 is analogous to connecting member 160 of FIG. 1. Piston 450 includes a first pulley block 425 and a second pulley block 435. System 310 includes a third pulley block 405 and a fourth pulley block 407 mounted onto a base, such as base 110 (FIG. 1). First pulley block 425 is operatively coupled to third pulley block 405 via a cable 415. Cable 415 is operatively coupled to cable 135. Likewise, second pulley block 435 is operatively coupled to fourth pulley block 407 via a cable 445. Cable 445 is operatively coupled to cable 125. System 310 further includes a first cable spool 455 coupled to cable 415 and a second cable spool 475 coupled to cable 445. Cable 415 is operatively coupled to cable 135 via an interface 465. Cable 445 is operatively coupled to cable 125 via an interface 485. Interface 485 may contain multiple roller/pulley arrangements to guide cables 125, 135 into plane with the pulley blocks 405, 407, compensating for their flight-varying angular orientation with respect to a base, such as base 110 (FIG. 1).

Operation of drive system 310 is described with reference to FIGS. 2 and 3. In a first stage, airfoil 120 is driven by wind, away from base station 110. Airfoil 120, in turn, pulls cable 125 away from base station 110. Cable 125, in turn, pulls on cable 445, thereby causing piston 450 move in direction shown by arrow head A via pulley block 435. This movement of piston 450 causes the fluid in cylinders 430, 440 to be compressed. The fluid compressed in cylinders 430, 440 may be transferred to a fluidically connected element (not shown), such as a hydraulic or pneumatic generator or turbine, or to a fluid-powered motor (e.g. a hydraulic motor), which, in turn, may drive machine 140. Embodiments may also incorporate, for example, at least one pressure accumulator, such as a storage tank, to buffer the machine 140 from fluctuations in power due to wind speed changes. This movement of piston 450 also causes pulley block 425 to move away from cylinders 410, 420. The movement of pulley block 425 pulls cable 415, which, in turn, pulls cable 135 toward base station 110. Cable 135, in turn, pulls airfoil 130 toward base station 110. The movement of airfoil 130 towards base station 110 is facilitated by airfoil controller 137 (of FIG. 1), which reduces the lift of airfoil 130. Thus, in the first stage of operation, the wind-driven airfoil 120 moves away from base station 110, causes piston 450 to move towards cylinders 430, 440 and also causes airfoil 130 to move toward base station 110. At the end of the first stage, airfoil 120 is at the farthest from base station 110 while airfoil 130 is at the nearest from base station 110.

In a second stage of operation, airfoil controller 137 (of FIG. 1) causes the lift of airfoil 130 to increase while airfoil controller 127 (of FIG. 1) causes the lift of airfoil 120 to decrease. The increase in the lift of airfoil 130 permits the wind to drive airfoil 130 away from base station 110. The wind-driven movement of airfoil 130 away from base station 110 pulls cable 135 away from base station 110. Cable 135, in turn, pulls on cable 415. Cable 415 causes pulley block 425 to move toward cylinders 410, 420, thereby causing piston 450 to move in direction of arrowhead B. The movement of piston 450 toward cylinders 410, 420 causes the fluid to be compressed in cylinders 410, 420. The fluid compressed in cylinders 410, 420 may be transferred to a fluidically connected element (not shown), such as a hydraulic or pneumatic generator or turbine, or to a fluid-powered motor (e.g. a hydraulic motor), which, in turn, may drive machine 140. Embodiments may also incorporate, for example, at least one pressure accumulator, such as a storage tank, to buffer the machine 140 from fluctuations in power due to wind speed changes. The movement of piston 450 toward cylinders 410, 420 further causes pulley block 435 away from cylinders 430, 440. The movement of pulley block 435 pulls cable 445, which, in turn, pulls cable 125 toward base station 110. Cable 125, thus, pulls airfoil 120 toward base station 110. The movement of airfoil 120 toward base station 110 is facilitated by airfoil controller 127 (of FIG. 1), which reduces the lift of airfoil 120. Thus, in the second stage of operation, the wind-driven airfoil 130 moves away from base station 110, causes piston 450 to move towards cylinders 410, 420 and also causes airfoil 120 to move toward base station 110. At the end of the second stage, airfoil 130 is at the farthest from base station 110 whereas airfoil 120 is at the nearest from base station 110. The reciprocating movement of piston 450 in both the stages drives machine 140 to perform work. The wind-driven movements of airfoils 120, 130 continue to cause the reciprocating movement of piston 450 so long as wind is available at sufficient speeds to maintain the flights of airfoils 120, 130.

Figure 4:
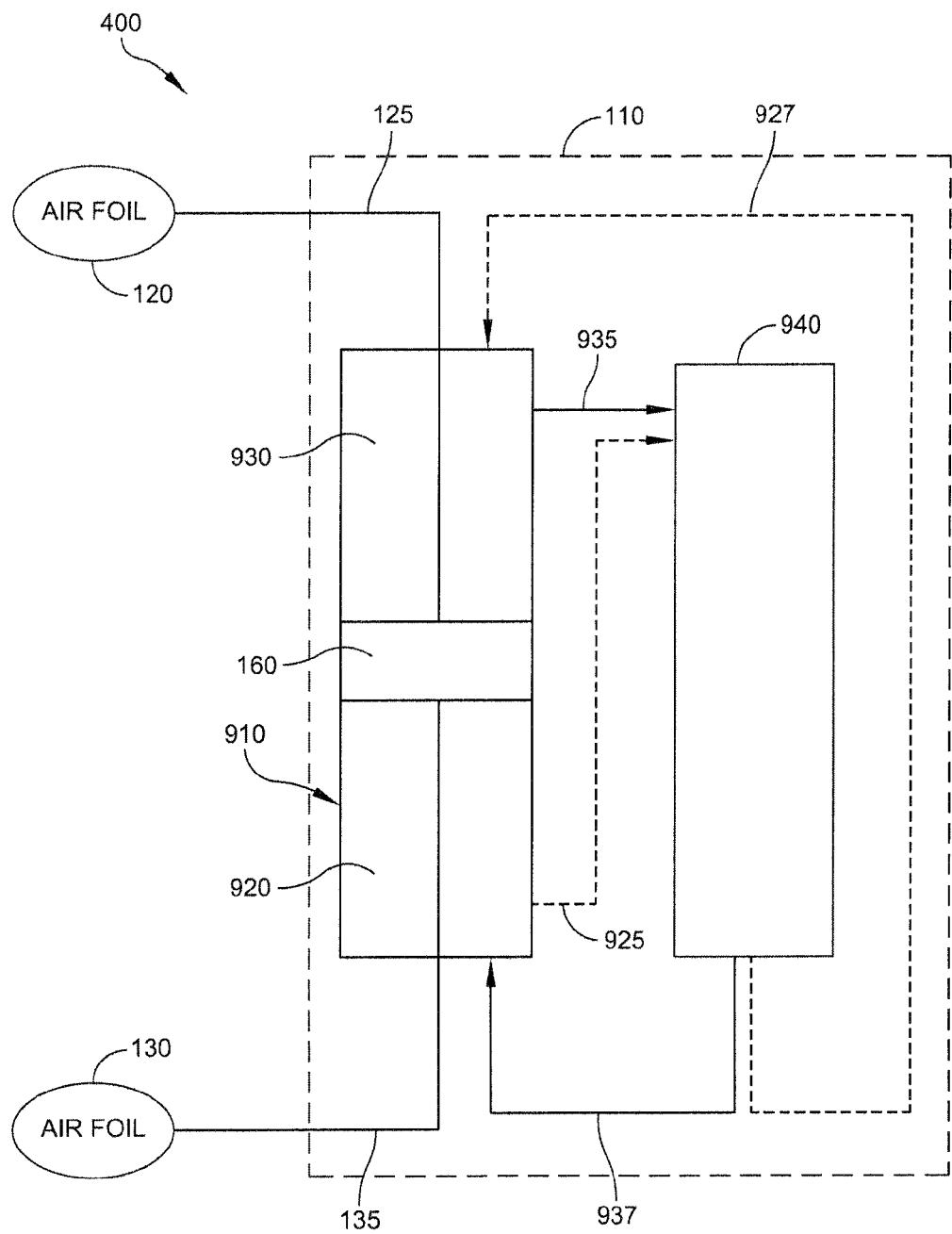
FIG. 4 is a schematic illustration of a fluid-powered drive system of FIG. 2, according to another embodiment of the invention.

Referring now to FIG. 4, a wind-powered system 400 with a fluid-powered drive system is schematically illustrated, according to an embodiment of the invention. System 400 includes a fluid-powered cylinder 910 in fluidic communication with a fluid-powered motor 940. Cylinder 910 and motor 940 are mounted on a base station 110. In an exemplary embodiment, motor 940 may be operatively coupled to a machine (such as machine 140 of FIG. 1) to perform work. In one configuration, the machine may be an electrical generator for generating electricity. System 400 further includes airfoils 120, 130 operatively coupled to a connecting member 160. In an exemplary embodiment, connecting member 160 may take the form of a piston for fluid-powered cylinder 910. In the illustrated embodiment, connecting member 160 divides cylinder 910 into a first compartment 920 and a second compartment 930. System 400 includes a control system (not shown), similar to control system 200 of FIG. 1A to control the operation of system 400. System 400 may optionally include a dirigible (not shown), similar to dirigible 170 of FIG. 1A and an altitude controller (not shown), similar to altitude controller 177 of FIG. 1A.

Operation of system 400 is described with reference to FIG. 4. During a first stage of the operation, the wind drives airfoil 120 away from base station 110. As airfoil 120 is driven by the wind, cable 125 is pulled thereafter, causing connecting member 160 to translate in cylinder 910 toward second compartment 930. The fluid in second compartment 930 is compressed and the compressed fluid is transferred to motor 940 via a duct 935. The compressed fluid performs work in motor 940 and enters first compartment 920 via duct 937. As connecting member 160 translates in cylinder 910 toward second compartment 930, connecting member 160 pulls cable 135 thereafter, thereby pulling airfoil 130 toward base station 110. The translation of connecting member 160 also causes an expansion of the volume of first compartment 920, which then receives the fluid ejected by motor 940. At the end of the first stage, airfoil 120 is at the farthest position from base station 110 whereas airfoil 130 is at the nearest position to base station 110.

During a second stage of the operation, airfoil controller 137 (of FIG. 1A) causes the lift of airfoil 130 to increase while airfoil controller 127 (of FIG. 1A) causes the lift of airfoil 120 to decrease. The increase in the lift of airfoil 130 causes the wind to drive airfoil 130 to move away from base station 110, thereby pulling cable 135 thereafter. Cable 135, in turn, pulls connecting member 160 toward first compartment 920, thereby compressing the fluid in first compartment 920. The fluid compressed in first compartment 920 is transferred to motor 940 via a duct 925 to perform work in motor 940. The compressed fluid in motor 940 enters second compartment 930 via a duct 927 after performing work in motor 940. The translation of connecting member 160 toward first compartment 920 pulls cable 125 thereafter. The translation of connecting member 160 toward first compartment 920 also causes the volume of second compartment 930 to expand for receiving the fluid from motor 940. Cable 125, in turn, pulls airfoil 120 toward base station 110. Thus, at the end of the second stage of the operation, airfoil 130 is at the farthest position from base station 110 whereas airfoil 120 is at the nearest position to base station 110. During both the stages, the compressed fluid from cylinder 910 performs work in motor 940. Motor 940 may, in turn, drive a machine (not shown), for example, to generate electricity. Airfoils 120, 130, thus, alternate in their wind-driven movements away from base station 110 and toward base station 110 and continue to compress the fluid in cylinder 910 as long as the wind speed is sufficient to maintain the flights of airfoils 120, 130.

Thus, in wind-powered systems 100, 300 and 400 described above, wind-driven airfoils 120, 130 act as pistons of an inline two cylinder engine. In other embodiments of the invention, wind-powered systems 100, 300 and 400 may include, by way of non-limiting examples only, four, six, eight or more airfoils, similar to a four, six, eight or more cylinder inline engine. While not inherently balanced, it is further envisioned that odd numbers of airfoils may be used on a common crankshaft. For example, three airfoils may be used having respective rocker arms coupled to the crankshaft with 120 degrees of separation therebetween. Independent control of the orientation of each of the airfoils is used to ensure the proper timing of the increasing and decreasing of airfoil lift throughout a revolution of the crankshaft.

Figure 5:
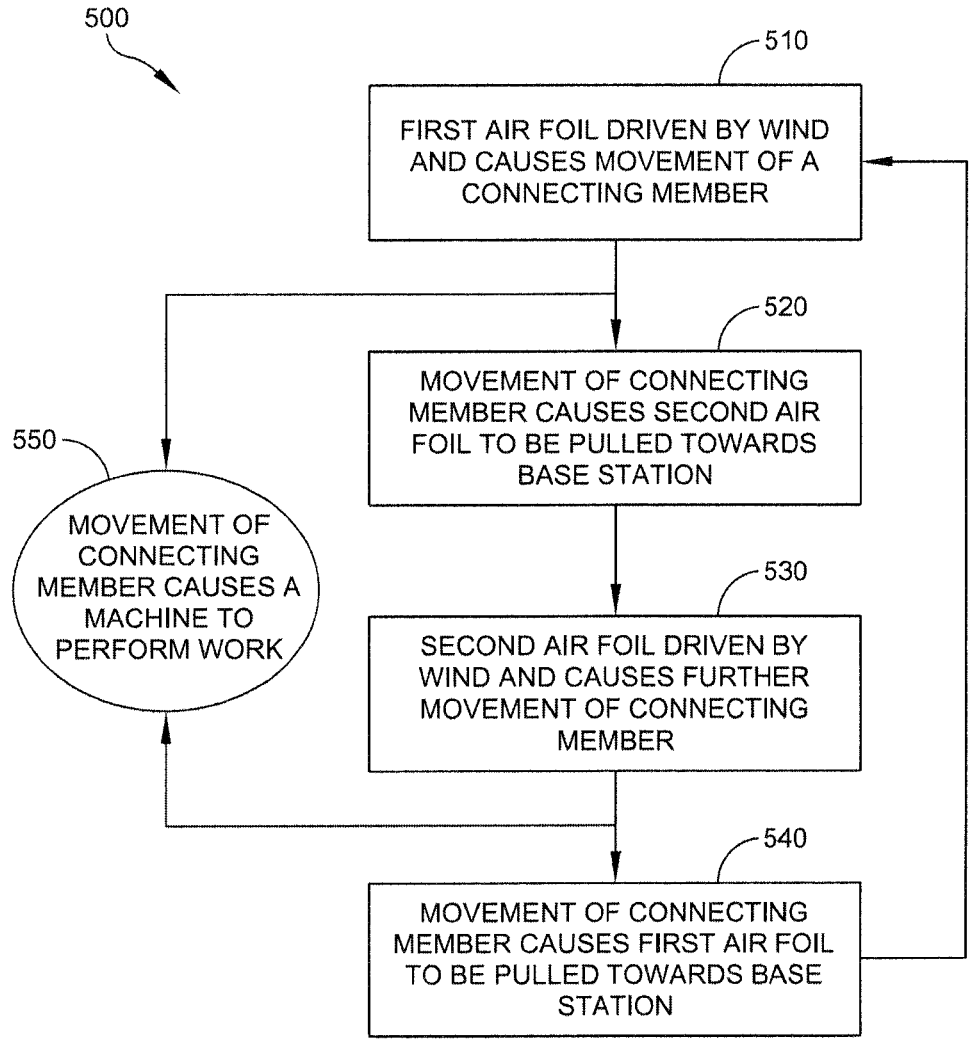
FIG. 5 is a process flow diagram of a wind-powered machine system performing work, according to an embodiment of the invention.

Referring now to FIG. 5, a process flow diagram 500 for using wind-driven airfoils to perform work, for example, to generate electricity, is illustrated. At block 510, airfoil 120 (of FIG. 1) is driven by wind to move in a direction away from base station 110 (of FIG. 1A). The movement of airfoil 120 causes the movement of a connecting member 160 (of FIG. 1A) or piston 450 (of FIG. 3) or connecting member 160 (of FIG. 4). At block 520, the movement of connecting member 160 causes airfoil 130 (of FIG. 1A) to be pulled toward base station 110 (of FIG. 1A). The movement of connecting member 160 also drives machine 140 (of FIG. 1A) and causes machine 140 (of FIG. 1A) to perform work, at block 550. In system 100 of FIG. 1A, connecting member 160 in the form of a crankshaft rotates and drives machine 140. In drive system 310 of FIG. 3, piston 450 compresses the fluid in cylinders 430, 440, which compressed fluid then performs work in a fluid-powered motor.

At block 530, airfoil 130 (of FIG. 1A) is driven by wind and starts moving away from base station 110 (of FIG. 1A). The movement of airfoil 130 causes a movement of connecting member 160 (of FIG. 1A) or piston 450 (of FIG. FIG. 3) or connecting member 160 (of FIG. 4). At block 540, the movement of connecting member 160 causes airfoil 120 to move toward base station 110 (of FIG. 1A). At the same time, the movement of connecting member 160 (of FIG. 1A) drives machine 140 (of FIG. 1A) and causes machine 140 (of FIG. 1A) to perform work, at block 550. In system 100 of FIG. 1A, connecting member 160 in the form of a crankshaft rotates and drives machine 140. In drive system 310 of FIG. 3, piston 450 compresses the fluid in cylinders 430, 440, which compressed fluid then performs work in a fluid-powered motor.

Figure 6:
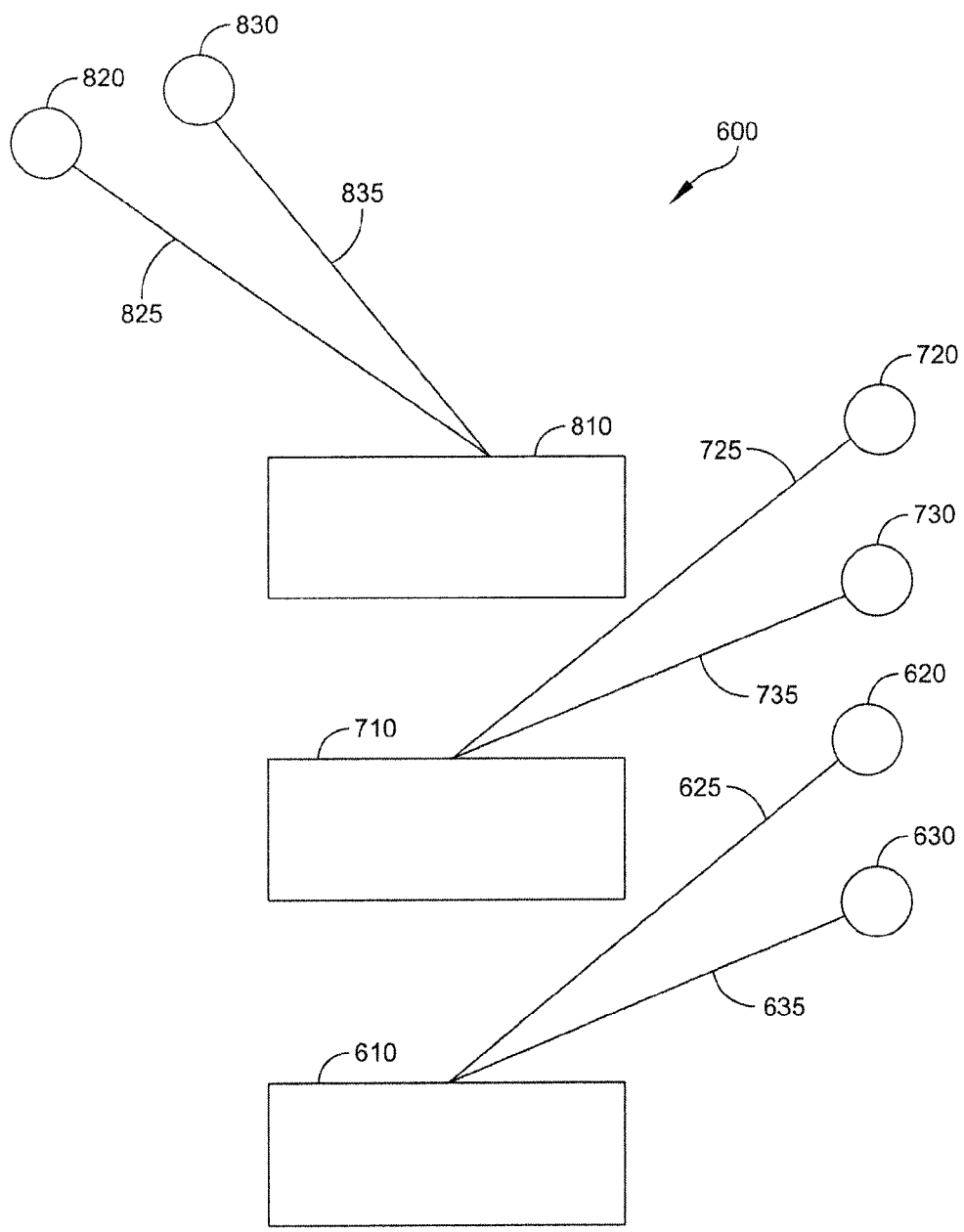
FIG. 6 is a schematic illustration of a plurality of variable altitude wind-powered machine systems in a stacked configuration, according to an embodiment of the invention.

Referring now to FIG. 6, system 600 including a plurality of wind-powered variable altitude systems in a stacked configuration is illustrated schematically, according to an embodiment of the invention. System 600 includes a first base station 610 and a first set of airfoils 620, 630 operatively coupled to base station 610; a second base station 710 and a second set of airfoils 720, 730 operatively coupled to base station 710; and a third base station 810 and a third set of airfoils 820, 830 operatively coupled to base station 810. In the illustrated embodiment, system 600 has three base stations 610, 710, 810. In other embodiments, system 600 may have less than three or more than three base stations. In the illustrated embodiment, each base station 610, 710, 810 has two airfoils 620, 630; 720, 730; and 820, 830, respectively, operatively coupled thereto. In other embodiments, each base station 610, 710, 810 may have more than two airfoils operatively coupled thereto. Each base station 610, 710, 810 includes a connecting member (not shown) and a machine (not shown) driven by the connecting member. Examples of connecting member and machine have been described above with reference to FIGS. 1, 3 and 4.

System 600 further includes a control system (not shown), similar to control system 200 of FIG. 2, for each base station 610, 710, 810, in one configuration. In other embodiments, system 600 may include a centralized control system for all base stations 610, 710, 810 and their associated airfoils and other elements. System 600 may further optionally include a dirigible (not shown), similar to dirigible 170 (of FIG. 1A) as well as an altitude controller (not shown), similar to altitude controller 177 (of FIG. 1A) for each set of airfoils 620, 630; 720, 730; 820, 830. In an exemplary embodiment, each airfoil 620, 630, 720, 730, 820, 830 includes an airfoil controller (not shown), similar to airfoil controllers 127, 137 (of FIG. 1A).

Systems 100, 300 and 400 may further optionally incorporate ice and water shedding mechanisms, which are known in the art, to maximize the flight and power harvesting time for systems 100, 300 and 400.

An advantage of the wind-powered systems described herein is that the base station may be mobile and/or portable and have a smaller footprint as compared to conventional windmill-based power generation systems. The smaller footprint makes it possible to deploy such a wind-powered generator system in many locations which may not be suitable for conventional windmill-based generation systems. Another advantage of the disclosed system is that the need for large tower support structures required in the conventional windmill-based systems is eliminated.

As is known in the art, the wind speed increases with the increase in the altitude. The conventional windmill-based systems are generally limited to operation at a generally fixed altitude at about one hundred (100) feet to about three hundred (300) feet above the ground. The present system advantageously enables to fly wind collecting airfoils from about ground level to about two to three thousand (2000-3000) feet above the ground. Furthermore, the altitude at which the airfoils collect the wind may be varied to track the air flow patterns and take advantage of different atmospheric conditions and wind speeds at different altitudes. Thus, the variable altitude wind-powered systems described herein are capable of harvesting the winds at different altitudes whereas the conventional windmill-based systems are constrained to a generally fixed altitude.

The airfoils of the disclosed wind-powered systems may be configured to have much larger wind capture cross-sections as compared to the blades of conventional windmill-based systems. Such larger cross-sections enable the capture of more wind energy for a given location as compared to that by a windmill-based system at the same location. Additionally, the disclosed stacked configuration utilizes multiple dimensions of air flow at a given site. Furthermore, the operation of conventional windmill-based systems is generally limited to laminar wind-flows and may have to be shut down in turbulent wind flows. In contrast, the disclosed wind-powered systems may be operational even in turbulent wind flows.

Another advantage of the wind-powered systems described herein is that collisions with migrating birds may be minimized as compared to that with the conventional windmill-based system. Furthermore, the effective wind capture cross section of the airfoils may be changed by bowing the foils or by rolling up the ends to shorten the span.

The wind-powered systems described herein may be fabricated at substantially lower costs as compared to those for conventional windmill-based systems which require costly support tower support structures. Furthermore, the operating as well as maintenance costs are also substantially lower as compared to the conventional windmill-based systems.

While the foregoing invention has been described with reference to the above-described embodiment, various modifications and changes can be made without departing from the spirit of the invention. Accordingly, all such modifications and changes are considered to be within the scope of the appended claims. Accordingly, the specification and the drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations of variations of various embodiments. Combinations of the above embodiments, and other embodiments not specifically described herein, will be apparent to those of skill in the art upon reviewing the above description.

What is claimed is:

1. A wind-powered machine system comprising:
   a base station comprising:
      a machine for performing work; and
      a crankshaft operatively coupled to said machine, wherein rotation of said crankshaft drives said machine to perform work;
   a first airfoil operatively coupled to said crankshaft;
   a second airfoil operatively coupled to said crankshaft; and
   a system controller configured to selectively alter at least one of the altitude and in-flight orientation of the first and second airfoils,
   wherein, in a first stage, a wind-driven movement of said first airfoil in a first direction away from said base station causes said crankshaft to rotate, said rotation of said crankshaft causing a movement of said second airfoil in a second direction generally opposite to said first direction and toward said base station, and
   wherein, in a second stage, a wind-driven movement of said second airfoil in the first direction away from said base station causes said crankshaft to rotate, said rotation of said crankshaft causing a movement of said first airfoil in the second direction toward said base station.

2. The system of claim 1, wherein said machine comprises an electrical generator.

3. The system of claim 1, further comprising first and second rocker arms each having a first and a second arm,
   wherein said first airfoil is operatively coupled to said first arm of said first rocker arm and said second airfoil is operatively coupled to said first arm of said second rocker arm,
   wherein said second arms of said first and second rocker arms are operatively coupled to said crankshaft, and
   wherein wind-driven movements of said first and second airfoils cause said first and second rocker arms to cause the rotation of said crankshaft.

4. The system of claim 3, wherein said first and second airfoils are operatively coupled to said first and second rocker arms via first and second tension cables, respectively.

5. The system of claim 1, further comprising an aerostat operatively coupled to said first and second airfoils to maintain said first and second airfoils at a given altitude.

6. The system of claim 5, further comprising an altitude controller operatively coupled to said aerostat, said altitude controller configured to vary the altitude of said aerostat and said first and second airfoils.

7. The system of claim 1, further comprising a gearbox operatively coupled to said crankshaft and said machine, said gearbox being configured to convert relatively slow rotation of said crankshaft into a relatively faster rotation for said machine.

8. The system of claim 1, wherein said first and second airfoils are configured to have a variable altitude relative to said base station.

9. The system of claim 1, wherein said system controller is responsive to at least one of the position of the crankshaft and the first and second airfoils and configured to output control signals for altering at least one of the altitude and in-flight orientation of the first and second airfoils.

10. The system of claim 9, wherein the system controller is configured to provide autonomous control of the first and second airfoils.

11. The system of claim 9, further comprising at least one airfoil controller in communication with said system controller, said airfoil controller coupled to the first and second airfoils via a plurality of steering lines and configured to vary the in-flight orientation of said first and second airfoils.

12. The system of claim 6, further comprising:
a first airfoil controller coupled to said first tension cable, configured to control steerage lines to control the flight pattern of said first airfoil; and
a second airfoil controller coupled to said second tension cable, configured to control steerage lines to control the flight pattern of said first airfoil,
wherein said altitude controller is coupled to said first airfoil controller and said second airfoil controller by first and second communication and power cables, respectively.

13. The system of claim 12, wherein said aerostat is coupled to said base station by a tether cable, said altitude controller is coupled to said tether cable, and said tether cable includes power and communication lines to said altitude controller and said first and second communication and power lines.

14. A wind-powered machine system comprising:
a base station comprising:
a machine for performing work; and
a crankshaft operatively coupled to said machine, wherein rotation of said crankshaft drives said machine to perform work;
a first airfoil operatively coupled to said crankshaft;
a second airfoil operatively coupled to said crankshaft;
a first steering element operatively connected to the first airfoil for selectively altering the lift generated by the first airfoil,
wherein a second steering element operatively connected to the second airfoil for selectively altering the lift generated by the second airfoil, in a first stage the lift generated by the second airfoil is reduced by the second steering element, and a wind-driven movement of said first airfoil in a first direction away from said base station causes said crankshaft to rotate, said rotation of said crankshaft causing a movement of said second airfoil in a second direction generally opposite to said first direction and toward said base station, and
wherein, in a second stage the lift generated by the first airfoil is reduced by the first steering element, and a wind-driven movement of said second airfoil in the first direction away from said base station causes said crankshaft to rotate, said rotation of said crankshaft causing a movement of said first airfoil in the second direction toward said base station.

15. The system of claim 14, wherein each of the steering first and second elements comprises a plurality of steering lines.

16. A wind-powered machine system comprising:
a base station comprising:
a machine for performing work; and
a crankshaft operatively coupled to said machine, wherein rotation of said crankshaft drives said machine to perform work; and
a first airfoil operatively coupled to said crankshaft via a first rocker arm and a first tension cable; and
a second airfoil operatively coupled to said crankshaft via a second rocker arm and second tension cable,
wherein, in a first stage, a wind-driven movement of said first airfoil in a first direction away from said base station causes said crankshaft to rotate, said rotation of said crankshaft causing a movement of said second airfoil in a second direction generally opposite to said first direction and toward said base station, and
wherein, in a second stage, a wind-driven movement of said second airfoil in the first direction away from said base station causes said crankshaft to rotate, said rotation of said crankshaft causing a movement of said first airfoil in the second direction toward said base station.

* * * * *